UNITED STATES PATENT OFFICE.

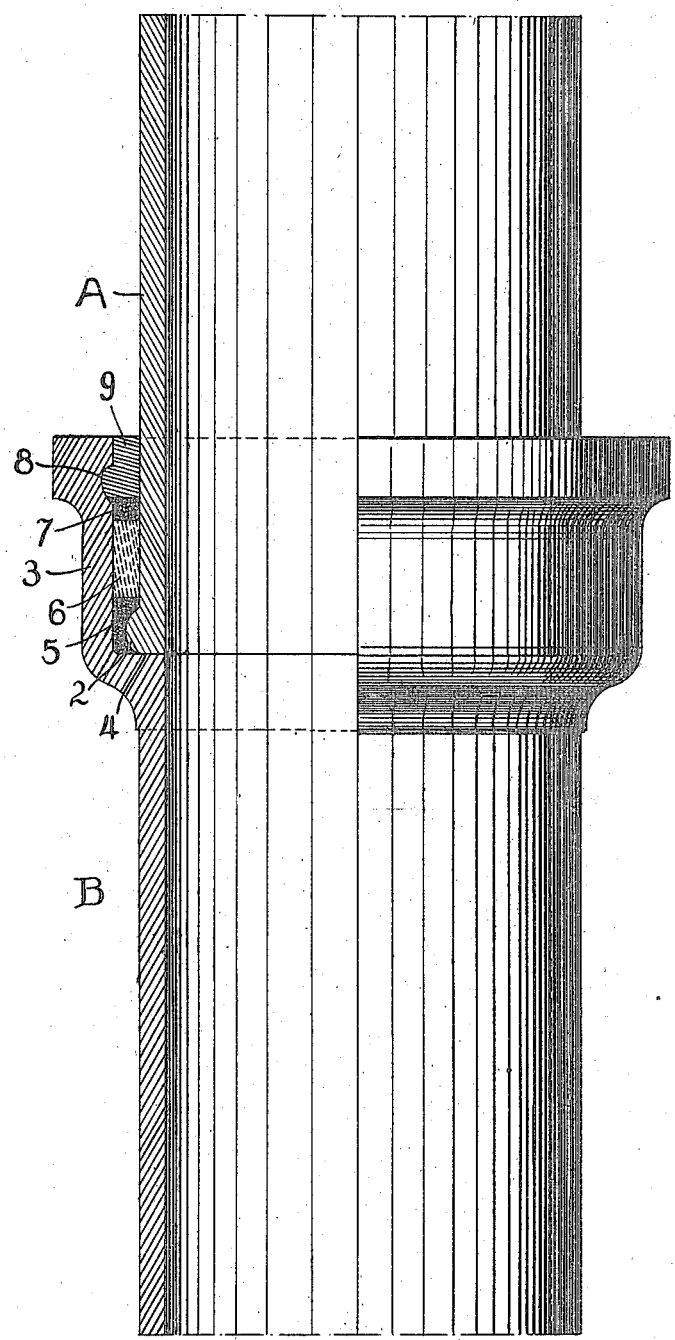

OLA S. JOHNSON, OF ST. PAUL, MINNESOTA.

PIPE-JOINT.

1,264,655.  Specification of Letters Patent.  Patented Apr. 30, 1918.

Application filed June 22, 1914. Serial No. 846,541.

*To all whom it may concern:*

Be it known that I, OLA S. JOHNSON, a citizen of the United States, residing at St. Paul, in the county of Ramsey and State of Minnesota, have invented certain new and useful Improvements in Pipe-Joints, of which the following is a specification.

My invention relates to improvements in pipe joints, its object being to provide a character of joint for sections of piping as gas piping where particularly tight joints are needed. The essential object of my invention is to secure a joint which, while being gas tight will also be of sufficiently yielding character to take up jars and keep the pipe from being easily broken.

The inclosed drawing represents a side elevation of alining pipe sections joined together by my features of invention, a portion of the pipe being shown in section.

Referring to the drawings A represents the spigot end of an inner pipe formed at its end with a bead 2. B represents the outer pipe, the end of which is outwardly flared to form a comparatively deep bell or cup 3 to receive loosely the spigot end of the inner pipe.

In use the beaded end of the inner pipe will be inserted in the cupped end of the outer pipe, abutting against the flange 4 forming the bottom of the cup. A layer of yarn or similar material 5 will then be inserted between the outer and inner pipes adjacent to the bead 2. Above this will be inserted cement 6 and above the cement 6 another layer of yarn or similar material 7. The cement 6 is positioned approximately midway between the bead 2 and the groove 8 and occupies approximately one-third of the full depth of the packing space in the bell, as shown in the drawings. Above the layer of yarn or similar material 7 is poured a filling ring of lead 9 extending into the groove 8 in the cupped or belled portion of the outer pipe, thus forming a key to hold the outer pipe against lengthwise movement after the packing is applied. Similarly the bead 2 locks the inner pipe A against lengthwise movement. The bead 2 and the groove 8 may be termed anchoring means. It is quite common to use a joint filling of either cement or lead and to use in connection therewith yarn or waste. The lead or cement joints ordinarily employed have proved inefficient. With the ordinary lead joint there is the advantage that it allows the pipe to expand and contract on changes in temperature without fracturing, and it is easily cut out, but it has the disadvantage that it is almost impossible to obtain a tight joint of lead and consequently the lead joint has not proved an efficient joint for gas pipes. The ordinary cement joint on the other hand is cheaper and more rigid than the lead joint and when properly made remains tight. The cement joint, however, possesses the disadvantage that it is more liable to fracture and that after applying the cement to the joint the pipe must be left uncovered for a considerable length of time to allow proper setting. As a consequence it is quite customary with main gas pipes to lay several sections with cement joints, and then every six to twelve lengths to put in a lead joint to act as an expansion joint, the location of the lead joint being kept track of so that it can be easily examined. This entails expense and labor. Cement joints, though gas-tight are too rigid, thereby causing pipe fracture. To avoid such rigidity applicant provides in his improved joint a comparatively short cement filling 6, so positioned in the packing space, relative to the depth thereof, as to bring it approximately midway the two anchoring means; namely, the grooves and the bead 2. Between each of the anchoring means and the cement 8, is the compressible packing 5 and 7 thoroughly tamped into place, so that, in the event of the sagging of the pipe sections, tending to separate the pipes lengthwise at their joints, the bead 2 and the groove 8 will pull in opposite directions and thus firmly crowd the compressible packing against their respective ends of the confined cement core 6. It will be noted, that the greater the tensile strain in the pipe line, due to the sagging, the firmer will the compressible packing be held against the cement and thereby seal any fracture in the cement caused by the sagging. The strain developed in the pipes at the joint, when sagging occurs, tends to either fracture the pipe or crush the cement. The proper length of the cement core is ascertained by experiment, and is intended to yield before the strain in the pipe has reached the ultimate breaking point.

My improved construction gives the advantages of both lead and cement joint without the disadvantages of either. The cement portion being interposed between the fillings 5 and 8 forms a tight joint between the inner and outer pipe and the fillings 5 and 8 serve as buffers to take up the jars and prevent fracture. Furthermore the cement serves as a rigid packing when the lead ring 9 is driven into the top space between the outer and inner pipe to allow the lead to be firmly and effectively driven in and prevent it from being forced too far down in the joint. Where the lead is driven in on a waste packing alone there is the disadvantage that the spongy packing allows the lead to be driven too far into the joint instead of being compressed. The firm backing of the cement portion allows proper compression of the lead ring.

I thus secure a joint which, while as gas tight as the ordinary cement joint, has not the easy fracturing characteristics thereof.

I claim as my invention:

1. In combination with a two section pipe joint, said sections having bell and spigot ends; the spigot end of one of said sections, fitting loosely into the bell end of the other section whereby an annular, comparatively deep space is provided around said spigot end and within said bell open at one end; an anchoring means on each of said sections; a cement filler in said space and approximately midway between said anchoring means; compressible packing on both sides of said cement filler; and a lead filler sealing said open end and completely filling said space.

2. In combination with a two section pipe joint, said sections having bell and spigot ends, the spigot end of one of said sections fitting loosely into the bell end of the other of said sections providing therebetween a packing space having an open end; and an anchoring means on each of said sections and in said space; a compressible packing in said space; a lead filling sealing the open end of said space; and a concrete core contacting with the inner and outer walls of said space, and also contacting at both ends with said compressible packing for the purpose specified.

In testimony whereof I affix my signature in presence of two witnesses.

OLA S. JOHNSON.

Witnesses:
H. SWANSON,
ARTHUR P. LOTHROP.

Copies of this patent may be obtained for five cents each, by addressing the "Commissioner of Patents, Washington, D. C."